United States Patent
Antill et al.

(10) Patent No.: US 9,003,400 B2
(45) Date of Patent: Apr. 7, 2015

(54) TRACKING COMPUTING SYSTEMS UTILIZING SOFTWARE REPOSITORIES

(75) Inventors: James Antill, Bristol, CT (US); Seth Kelby Vidal, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 504 days.

(21) Appl. No.: 12/955,671

(22) Filed: Nov. 29, 2010

(65) Prior Publication Data

US 2012/0137283 A1    May 31, 2012

(51) Int. Cl.
*G06F 9/445* (2006.01)
(52) U.S. Cl.
CPC ........................................ *G06F 8/60* (2013.01)
(58) Field of Classification Search
None
See application file for complete search history.

(56) References Cited

U.S. PATENT DOCUMENTS

| | | | |
|---|---|---|---|
| 6,438,749 B1 | 8/2002 | Chamberlain | |
| 7,240,336 B1 | 7/2007 | Baker | |
| 7,290,258 B2 * | 10/2007 | Steeb et al. | 717/178 |
| 7,334,226 B2 * | 2/2008 | Ramachandran et al. | 717/177 |
| 7,512,939 B2 | 3/2009 | Brookner | |
| 7,624,393 B2 | 11/2009 | Egan et al. | |
| 7,657,885 B2 | 2/2010 | Anderson | |
| 7,836,341 B1 | 11/2010 | Krishnan | |
| 8,832,680 B2 * | 9/2014 | Akiyama | 717/176 |
| 2003/0046681 A1 * | 3/2003 | Barturen et al. | 717/177 |
| 2003/0051235 A1 | 3/2003 | Simpson | |
| 2003/0229890 A1 | 12/2003 | Lau et al. | |
| 2004/0215755 A1 * | 10/2004 | O'Neill | 709/223 |
| 2005/0132357 A1 * | 6/2005 | Shell et al. | 717/174 |
| 2005/0210459 A1 | 9/2005 | Henderson et al. | |
| 2006/0190773 A1 | 8/2006 | Rao et al. | |
| 2006/0230395 A1 * | 10/2006 | Paul et al. | 717/173 |
| 2006/0230398 A1 | 10/2006 | Yokota | |
| 2007/0038991 A1 | 2/2007 | Schuft et al. | |
| 2007/0157192 A1 | 7/2007 | Hoefler et al. | |
| 2007/0169075 A1 | 7/2007 | Lill et al. | |
| 2008/0134165 A1 | 6/2008 | Anderson et al. | |
| 2008/0141240 A1 | 6/2008 | Uthe | |
| 2008/0201705 A1 | 8/2008 | Wookey | |
| 2009/0013319 A1 | 1/2009 | Williams et al. | |
| 2009/0037897 A1 | 2/2009 | Dull et al. | |
| 2009/0204961 A1 * | 8/2009 | DeHaan et al. | 718/1 |
| 2009/0300595 A1 | 12/2009 | Moran et al. | |
| 2010/0023933 A1 | 1/2010 | Bryant et al. | |
| 2010/0058308 A1 | 3/2010 | Demshur et al. | |
| 2010/0058314 A1 | 3/2010 | Wang | |
| 2010/0083243 A1 | 4/2010 | Mincarelli et al. | |
| 2010/0333086 A1 * | 12/2010 | Prabu et al. | 717/178 |
| 2011/0131567 A1 * | 6/2011 | Tirk et al. | 717/176 |
| 2014/0304695 A1 * | 10/2014 | Gambardella et al. | 717/168 |

OTHER PUBLICATIONS

Yeh et al., Tracking the changes of dynamic web pages in the existence of URL rewriting, Nov. 2006, 8 pages.*
Yuan et al., Software-based implementations of updateable data structures for high-speed URL matching, Oct. 2010, 2 pages.*
Seth Kelby Vidal, "Systems and Methods for Initiating Software Repairs in Conjuction With Software Package Updates", U.S. Appl. No. 12/714,200, filed Feb. 26, 2010.

(Continued)

*Primary Examiner* — Thuy Dao
(74) *Attorney, Agent, or Firm* — Lowenstein Sandler LLP

(57) ABSTRACT

A software repository can capture and record an identifier associated with a software package manager accessing the software repository.

14 Claims, 4 Drawing Sheets

(56) References Cited

OTHER PUBLICATIONS

Seth Kelby Vidal, "Systems and Methods for Diagnostic Notification Via Package Update Manager", U.S. Appl. No. 12/714,258, filed Feb. 26, 2010.

Seth Kelby Vidal, "Systems and Methods for Managing Software Package Updates Using Communication Pipes", U.S. Appl. No. 12/714,208, filed Feb. 26, 2010.

Seth Kelby Vidal, "Systems and Methods for Generating and Storing Translation Information As Package Metadata", U.S. Appl. No. 12/714,171, filed Feb. 26, 2010.

Seth Kelby Vidal, "Systems and Methods for Generating Predictive Diagnostics Via Package Update Manager", U.S. Appl. No. 12/714,222, filed Feb. 26, 2010.

James Antill, "Systems and Methods for Defining and Enforcing Access Policy for Package Update Processes", U.S. Appl. No. 12/873,850, filed Sep. 1, 2010.

Seth Kelby Vidal, "Systems and Methods for Generating Cached Representations of Encoded Package Profile", U.S. Appl. No. 12/788,139, filed May 26, 2010.

Seth Kelby Vidal, "Systems and Methods for Generating Cached Representations of Host Package Inventories in Remote Package Repositories", U.S. Appl. No. 12/790,699, filed May 28, 2010.

Seth Kelby Vidal, "Systems and Methods for Generating Package Profiles in Software Package Repositories Using Selective Subsets of Packages", U.S. Appl. No. 12/873,557, filed Sep. 1, 2010.

Seth Kelby Vidal, "Systems and Methods for Generating an Encoded Package Profile Based on Executing Host Processes", U.S. Appl. No. 12/787,104, filed May 26, 2010.

Seth Kelby Vidal, "Systems and Methods for Restoring Machine State History Related to Detected Faults in Package Update Process", U.S. Appl. No. 12/788,036, filed May 26, 2010.

Seth Kelby Vidal, "Systems and Methods for Generating Client Qualification to Execute Package Update Manager", U.S. Appl. No. 12/788,458, filed May 27, 2010.

Seth Kelby Vidal, "Systems and Methods for Determining When to Update a Package Manager Software", U.S. Appl. No. 12/790,752, filed May 28, 2010.

Seth Kelby Vidal, "Systems and Methods for Generating Exportable Encoded Identifications of Networked Machines Based on Installed Package Profiles", U.S. Appl. No. 12/768,416, filed Apr. 27, 2010.

Seth Kelby Vidal, "Systems and Methods for Managing Versions of Software Packages", U.S. Appl. No. 13/037,363, filed Mar. 1, 2011.

Seth Kelby Vidal, "Systems and Methods for Automatic Upgrade and Downgrade in Package Update Operations", U.S. Appl. No. 12/892,227, filed Sep. 28, 2010.

Seth Kelby Vidal, "Systems and Methods for Detection of Malicious Software Packages", U.S. Appl. No. 12/898,876, filed Oct. 6, 2010.

Seth Kelby Vidal, "Systems and Methods for Space Efficient Software Package Management", U.S. Appl. No. 12/610,006, filed Oct. 30, 2009.

* cited by examiner

TRACKING COMPUTING SYSTEMS UTILIZING SOFTWARE REPOSITORIES

FIELD

This invention relates generally to computer software installation for computing systems.

DESCRIPTION OF THE RELATED ART

Today, a person using a computing system has a variety of avenues for obtaining software and installing the software on the computing system, such as purchasing physical media and downloading the software over a network. When downloading the software over a network, the person can acquire and install the software using a software package delivery system. The software package delivery system typically consists of a software repository which stores and maintains various software packages. The software packages typically consist of software stored in an archive format that includes data for installing the software.

Typically, a software repository lacks the ability to accurately and anonymously track computing systems downloading software packages. To track the computing systems, the software repository can require that the computing systems, which download software packages, register with the software repository. By requiring registration, the computing systems cannot anonymously download software packages, and the users of the computing systems are required to perform additional steps to download a software package. Additionally, tracking the computing systems through registration may not be accurate. For example, a user of computing system may register multiples times with the software repository, which would prevent the software repository from accurately tracking the number of computing systems accessing the repository.

Further, the software repository can attempt to track the computing systems using network information, such as Internet Protocol (IP) addresses. The network information, however, does not provide an accurate method to track the computing systems because IP addresses can be dynamically assigned and thus change regularly. Accordingly, software repositories lack the ability to anonymously and accurately track computing systems downloading software packages.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present teachings are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific embodiments. Electrical, mechanical, logical and structural changes may be made to the embodiments without departing from the spirit and scope of the present teachings. The following detailed description is, therefore, not to be taken in a limiting sense and the scope of the present teachings is defined by the appended claims and their equivalents.

Embodiments of the present teachings relate to systems and methods for tracking computing systems downloading software packages from software repositories. According to embodiments, a software repository can be configured to capture and record a universal unique identifier (UUID) associated with a software package manager accessing the software repository. To capture the UUID, the software repository can be encoded as a base Universal Resource Locator (URL) that includes a redirection (e.g. undefined field) to capture the UUIDs of the software package managers. Once captured, the UUIDs can be stored in a record along with any other relevant information such as the software packages downloaded, the date/time of download, and the like.

By tracking the computing systems using the UUID assigned by the software package manager, a software repository can track computing systems, accurately and anonymously, without requiring further steps to be taken by the users of the computing system. As such, the software repository can determine the number of computing systems accessing the software repository and other relevant statistics.

Figure 1:
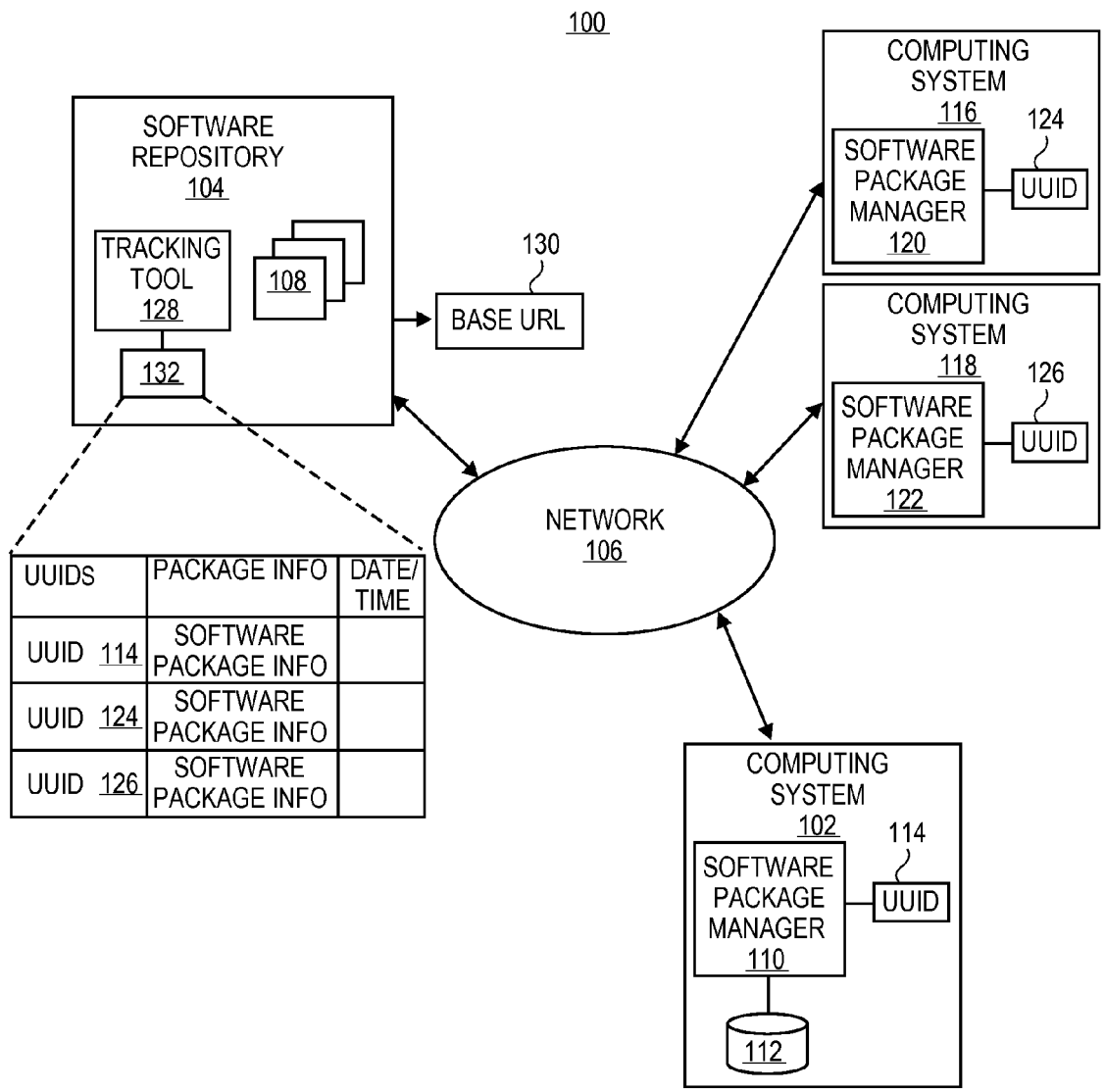
FIG. 1 illustrates an example of a software package delivery system including a tracking tool, in which various embodiments of the present teachings can be practiced.

FIG. 1 illustrates a software package delivery system 100, according to various embodiments of the present teachings. While FIG. 1 illustrates various components that can be included in the software package delivery system 100, one skilled in the art will realize that additional components can be added or existing components can be removed.

As illustrated in FIG. 1, the software package delivery system 100 can be designed to allow a computing system 102 to communicate with a software repository 104 via one or more networks 106. The computing system 102 can communicate with the software repository 104 in order to obtain and install software packages 108. The software repository 104 can be implemented as any type of open-source or proprietary software repository, which can store the software packages 108 and provide the software packages 108 to the computing system 102. For example, the software repository 104 can be implemented as a Yum repository, Debian™ repository, or any other type of conventional software repository.

As described herein, the software packages 108 can include one or more software programs or software program updates that are packaged together in a format that allows a software package manger or software package installer to install the software programs or updates, contained in the software packages 108. The software programs included in the software packages 108 can be any type of software programs such as operating systems (OS), application programs, and the like or updates to these software programs. The software packages 108 can also include metadata that describes the software packages, such as the name of the software package, the software programs included in the package, epoch, version and release of the software packages, architecture for which the software package was built, description of the purpose of the software packages, etc. The software packages 108 can also include metadata that aids in the installation of the software programs contained in the software packages, such as checksums, format of the checksums, and a list of dependencies of the software packages. The checksums verify the integrity of the files of the software packages 108, e.g. that the files of the software packages are complete and correct. The list of dependencies can describe the relationship of the software programs or software program updates contained in the software packages 108 and any other software programs, file, software libraries, etc. required by the software packages.

The software repository 104 can store the software packages 108 in any type of open-source or proprietary format depending on the type of the software repository. For example, the software packages 108 can be in conventional formats such as RPM format for a Yum repository, .deb format for a Debian™ repository, or other conventional archival formats such as .jar .zip, tar.gz, and the like.

The software repository 104 can be supported by any type of computing system(s) capable of storing the software packages, capable of communicating with the one or more networks 106 and capable of running a repository application for cooperating with a software package manager or software package installer in order to deliver the software packages 108. For example, the software repository 104 can be supported by conventional computing systems or other devices such as such as servers, personal computers, laptop computers, network-enabled media devices, networked stations, etc. As such, the computing systems supporting the software repository 104 can include conventional hardware such as processors, memory, computer readable storage media and devices (CD, DVD, hard drive, portable storage memory, etc.), network devices, and the like.

The one or more networks 106 can be or include the Internet, or other public or private networks. The one or more networks 106 can be or include wired, wireless, optical, and other network connections. One skilled in the art will realize that the one or more networks 106 can be any type of network, utilizing any type of communication protocol, to connect computing systems.

The computing system 102 can be any type of conventional computing system or other device such as such as servers, personal computers, laptop computers, network-enabled media devices, networked stations, etc. As such, the computing system 102 can include conventional hardware such as processors, memory, computer readable storage media and devices (CD, DVD, hard drive, portable storage memory, etc.), network devices, and the like.

In order to communicate with the software repository 104, the computing system 102 can include a software package manager 110. The software package manager 110 can be configured to cooperate with the software repository 104 to perform various actions associated with the software packages. For example, the software package manager 110 can be configured to retrieve one or more of the software packages 108 maintained by the software repository 104, and configured to install the software packages 108 on the computing system 102. Likewise, the software package manager 110 can be configured to retrieve updates to the software packages 108, already installed on the computing system 102, and install the updates on the computing system 102.

The software package manager 110 can be configured to allow a user of the computing system 102 to request the various actions associated with installing and updating software packages. To achieve this, the software package manager 110 can be configured to provide command line interfaces and/or graphical user interfaces (GUIs) that allow the user to direct the software package manager 110 to perform the actions. For example, the software package manager 110 can provide GUIs that display the software packages, such as new software packages and software package updates, available in the software repository 104 and that allow the user to select the action to be performed related to the software packages. Likewise, in order to perform the various actions, the software package manager 110 can be configured to communicate with the software repository 104 and retrieve data from the software repositories. For example, when providing the GUIs to a user of the computing system 102, the software package manager 110 can retrieve a list of the software packages 108 from the software repository 104. Likewise, for example, when installing or updating a particular software package, the software package manager 110 can retrieve the particular software package updates and any other data associated with the particular software package.

When performing the various actions, the software package manager 110 can be configured to utilize the metadata associated with the software packages 108 in order to perform the actions. For example, when installing a particular software package or updating a particular software package, the software package manager 110 can access the metadata associated with the particular software package in order to properly install or update the software package on the computing system 102. For instance, the software package manager 110 can utilize the checksums and the list of dependencies in the metadata in order to identify and verify the software programs, files, and software libraries that are affected. Additionally, when performing the various actions, the software package manager 110 can be configured to store the metadata in a database 112.

The software package manager 110 can be any application program that is capable of executing on the computing system 102 to perform the actions described above. For example, the software package manager 110 can be any type of conventional open-source or proprietary package manager such as Yum package manager, Debian™ package manager, and the like. The software package manager 110 can be stored on computer readable storage devices or media (CD, DVD, hard drive, portable storage memory, etc.) of the computing system 102 and executed by the computing system 102.

According to embodiments, when the software package manager 110 is installed on the computing system 102, the software package manager 110 can be assigned a universal unique identifier (UUID) 114. The UUID identifies the software package manager 110 installed on the computing system 102. The UUID 114 can be any combination of textual and/or numerical characters that identify the software package manager 110. The UUID 114 can be generated by the software package manager 110 and/or can be generated by another software program installed on the computing system 102 (e.g. OS). For example, the software package manager 110 can be configured to include a module (e.g. python module) to generate the UUID 114 and/or can be configured to communicate with another software program (e.g. OS) to generate the UUID 114. The UUID 114 can be generated utilizing any type of algorithm or procedure. For example, the UUID 114 can be randomly generated. Once generated, the UUID 114 can be stored in a computer readable storage medium of the computing system 102. For example, the UUID 114 can be stored as a file in a directory associated with the software package manager 110, for example "/var/lib/yum/UUID."

As illustrated in FIG. 1, the software package delivery system 100 can include additional computing systems such as computing system 116 and computing system 118. The computing system 116 and the computing system 118 can include a software package manager 120 and a software package manager 122, respectively, for acquiring and installing the software packages 108 from the software repository 104. As described above, the software package manager 120 and the software package manager 122 can be assigned a UUID 124 and a UUID 126, respectively.

Accordingly to embodiments, the software repository 104 can utilize the UUIDs of the computing systems that are downloading the software packages 108. The software repository 104 can include a tracking tool 128. The tracking tool 128 can be configured to capture and record the UUID of a software package manager requesting the software packages 108. The tracking tool 128 can be implemented as an application program that is capable of executing on the computing systems supporting the software repository 104 to perform the processes as described herein. As such, the tracking tool 128 can be configured to include the necessary logic, commands, instructions, and protocols in order to perform the methods and processes described herein. Likewise, the tracking tool 128 can be implemented as a portion of another application program, such as the software repository applications. In either case, the tracking tool 128 can be stored on computer readable storage devices or media (CD, DVD, hard drive, portable storage memory, etc.) of the computing systems supporting the software repository 104 and can be executed by the computing systems supporting the software repository 104.

In embodiments, the tracking tool 128 can be configured to capture and record the UUIDs of the software package managers requesting the software packages 108 as the software package managers request access to the software repository 104 and request the software packages 108. For example, the tracking tool 128 can capture and record the UUID 114, the UUID 124, and the UUID 126 as each of the software package manager 110, the software package manager 120, and the software package manager 122 request access to the software repository 104 and request the software packages 108. To achieve this, the software repository 104 can be configured as an encoded link that captures the UUIDs of the software packages managers that request access to the software repository 104. Access to the software repository 104 can be encoded as a base Universal Resource Locator CURL) 130 that includes a redirection (e.g. undefined field) to capture the UUIDs of the software package managers. For example, the software repository 104 can be encoded as the base URL 130 "http:/www.example.com/myreop/?uuid=$uuid." In this example, when a software package manager access the base URL 130, the value "$uuid" can be replaced with the UUID of the software package manager requesting access. For instance, when the software package manager 110 of the computing system 102 requests access, the value "$uuid" can be replaced with the UUID 114 of the software package manager 110.

In embodiments, once the UUID is captured, the tracking tool 128 can be configured to record the captured UUIDs in a record 132. The record 132 can be any type of data structure, for example a table as illustrated, capable of storing the UUIDs and other information such as the software packages 108 requested by the software package managers and the date and time the software packages 108 were requested. The record 132 can be stored on computer readable storage devices or media (CD, DVD, hard drive, portable storage memory, etc.) of the computing systems supporting the software repository 104 and accessed by the computing systems supporting the software repository 104.

In embodiments, the tracking tool 128 can be configured to create, access, and modify the record 132. For example, when a UUID is captured, the tracking tool 128 can be configured to search the record 132 to determine if the UUID is already recorded, to generate a new entry for the UUID if the UUID is not recorded, and to record the captured UUID and the other information in the record 132. Likewise, for example, if the captured UUID is already recorded, the tracking tool 128 can be configured to update the other information and the date/ time information. To achieve this, the tracking tool 128 can be configured to include the necessary logic, commands, instructions, and protocols to create, access, and modify the record 132.

In embodiments, the software repository 104 can be configured to utilize the information stored in the record 132 to track the computing systems accessing the software repository 104 and to track statistics of the requests for the software packages 108. For example, the tracking tool 128 can be configured to extract information from the record 132 at the request of an administrator or user of the software repository 104. To achieve this, the tracking tool 128 can be configured to generate the command line interfaces and/or GUIs that allow an administrator or user to request information from the record and display the requested information.

For example, an administrator can desire to know the number of computing system that have accessed the software repository 104 and requested the software packages 108. In this example, the administrator can utilize the tracking tool 128 to request the number of computing systems and other information. Accordingly, the tracking tool 128 can access the record 132 and count the number of UUIDs stored in the record (i.e. the number of computing systems accessing the software repository), and provide the information to the administrator. Likewise, the tracking tool 128 can provide other information such as the software packages downloaded and the dates/time they were downloaded.

In another example, an administrator can desire to know other statistics of the software repository 104 such as the number of computing system that have downloaded a particular one of the software packages 108. In this example, the administrator can utilize the tracking tool 128 to request the statistics of the software repository 104. Accordingly, the tracking tool 128 can access the record 132 and count the number of UUIDs stored in the record that have downloaded the particular one of the software packages 108 (i.e. the number of computing systems that have downloaded the particular one of the software packages 108), and provide the information to the administrator. Likewise, the tracking tool 128 can provide other information such as the dates/time they were downloaded. One skilled in the art will realize that the statistics determined and provided by the tracking tool 128 can be any information that is stored in the record 132, for example, the number of computing systems that accessed the software repository 104 on a particular date/time, the number of computing systems that downloaded a particular one of the software packages 108 on a particular date/time, the frequency the software repository is accessed, the frequency the software packages are downloaded, and the like.

In embodiments, the tracking tool 128 can be configured to publish the statistics of the software repository 104. The tracking tool 128 can be configured to publish the statistics in a web page or other type of forum that is accessible via the one or more networks 106. To achieve this, the tracking 128 can be configured to include the necessary logic, commands, instructions, and protocols to generate and/or populate a web page or other type of forum with the information contained in the record 132. Additionally, the tracking tool 128 can be configured to provide the statistics to external network sites (e.g. web pages or other types of forums) for publication. To achieve this, the tracking tool 128 can be configured to include the necessary logic, commands, instructions, and protocols to communicate with the external network sites via the network 106.

Figure 2:
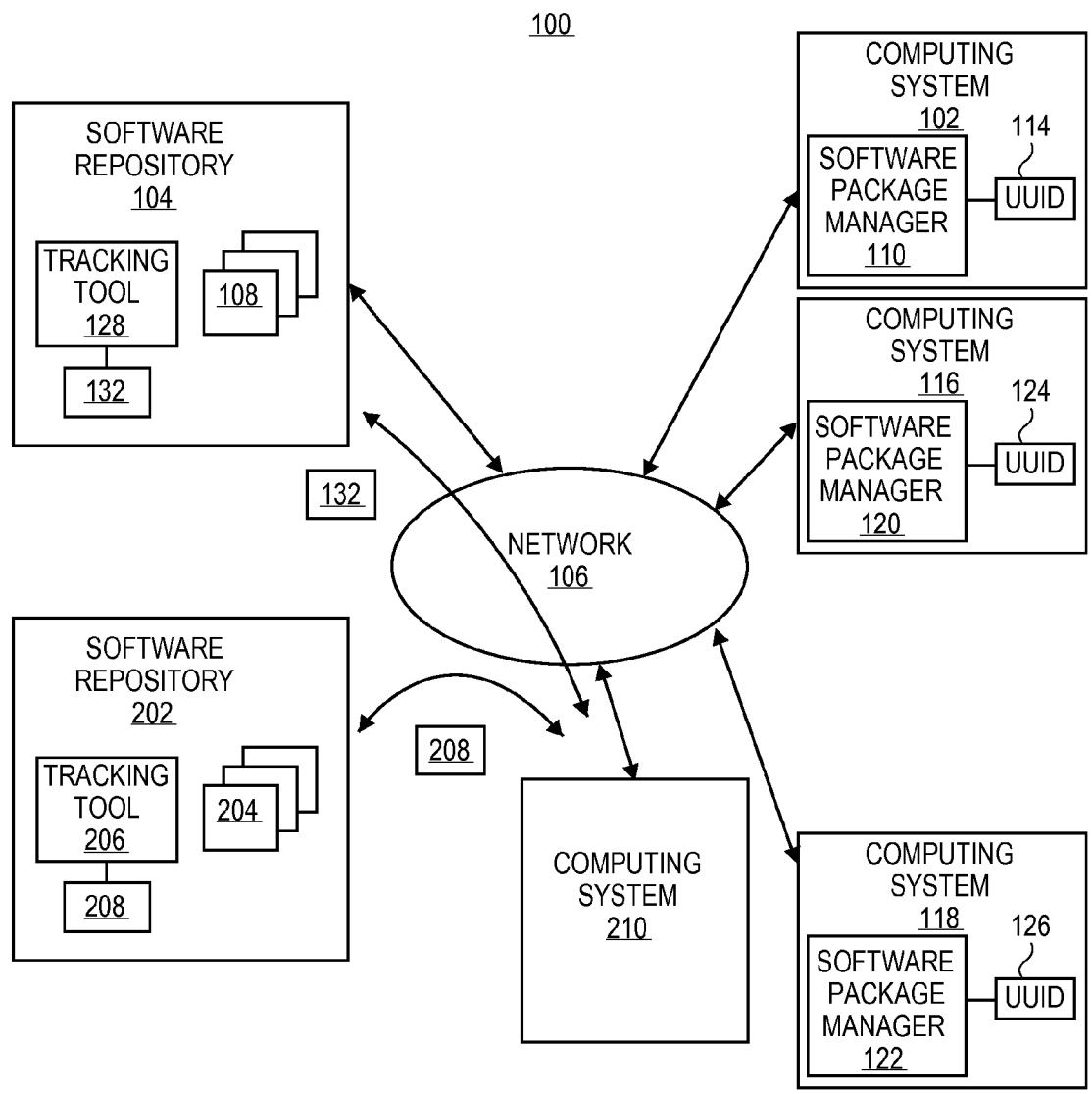
FIG. 2 illustrates another example of a software package delivery system including a tracking tool, according to various embodiments.

As illustrated in FIG. 1, the software delivery system 100 can include a software repository 104. FIG. 2 illustrates another example of the software package delivery system 100 which can include multiple software repositories such as the software repository 104 and a software repository 202, according to various embodiments of the present teachings. While FIG. 2 illustrates various components that can be included in the software package delivery system 100, one skilled in the art will realize that additional components can be added or existing components can be removed.

As illustrated in FIG. 2, the software repository 202 can be configured to provide software packages 204 for download and installation. The software packages 204 can be the same as software packages 108, different software packages, or combination of both. The software repository 202 can be configured to include its own copy 206 of the tracking tool 128. The tracking tool 206 can be configured to track the computing systems, for example the computing systems 102, 116, and 118, accessing the software repository 202 and downloading the software packages 204. As described above, the tracking tool 706 can be configured to store the UUIDs of the computing systems and other information in a record 208.

The software repository 104 and the software repository 202 can be supported by the same computing systems. Likewise, the software repository 104 and the software repository 202 can be supported by the different computing systems. In either case, the software repository 202 can be supported by any type of computing system(s) capable of storing the software packages, capable of communicating with the one or more networks 106 and capable of running a repository application for cooperating with a software package manager or software package installer in order to deliver the software packages 204. For example, the software repository 202 can be supported by conventional computing systems or other devices such as such as servers, personal computers, laptop computers, network-enabled media devices, networked stations, etc. As such, the computing systems supporting the software repository 202 can include conventional hardware such as processors, memory, computer readable storage media and devices (CD, DVD, hard drive, portable storage memory, etc.), network devices, and the like.

As described above, the software repository 104 and the software repository 202 can utilize the tracking tool 128 and the tracking tool 206, respectively, to track the computing systems 102, 116, and 116 accessing the software repository 104 and the software repository 202. Likewise, the software repository 104 and the software repository 202 can utilize the tracking tool 128 and the tracking tool 206, respectively, to generate and publish statistics for the software repository 104 and the software repository 202.

In embodiments, the information stored in the record 132 and the record 208 can be utilized to track the computing systems accessing both the software repository 104 and the software repository 202 and to track the statistics across both the software repository 104 and the software repository 202. For example, an administrator of the software repository 104 and the software repository 202 can desire to know which of the the software repository 104 and the software repository 202 is more popular and/or which of the software packages 108 and the software packages 204 are more popular. The information stored in the record 132 and the record 208 can be utilized to determine the number of computing system accessing the software repository 104 and the software repository 202, the software packages being downloaded, the dates and times of the access and download. Likewise, the information stored in the record 132 and the record 208 can be utilized to determine statistics such as which of the software repository 104 and the software repository 202 has been accessed more (i.e. higher number of UUIDs recorded), which of the software packages 108 and the software packages 204 have been downloaded more (i.e. higher number UUIDs recorded as downloading a particular package), which of the software repository 104 and the software repository 202 is more frequently accessed (i.e. date/time between accesses), which of the software packages 108 and 204 are more frequently downloaded (i.e. date/time between downloads), activity patterns of the software repository 104 and the software repository 202 (i.e. dates and times accessed), and the like.

In embodiments, either one of the tracking tool 128 and the tracking tool 206 can be configured to track the statistics across both the software repository 104 and the software repository 202. To achieve this, either one of the tracking tool 128 and the tracking tool 206 can be configured to provide the information stored in the record 132 or record 208 to the other. Likewise, a computing system 210 can be configured to track the statistics across both the software repository 104 and the software repository 202. To achieve this, the software repository 104 and the software repository 202 can be configured to provide the record 132 and the record 208 (or a subset of the information contained in the records) to the computing system 210 via the one or more networks 106. The computing system 210 can be configured to include the necessary logic, commands, instructions, and protocols to access the record 132 and the record 208 and to generate the statistics for the software repository 104 and the software repository 202, as described above.

In embodiments, the tracking tool 128, the tracking tool 206, and/or the computing system 210 can be configured to publish the statistics of the software repository 104 and the software repository 202. The tracking tool 128, the tracking tool 206, and/or the computing system 210 can be configured to publish the statistics in a web page or other type of forum that is accessible via the one or more networks 106. To achieve this, the tracking tool 128, the tracking tool 206, and/or the computing system 210 can be configured to include the necessary logic, commands, instructions, and protocols to generate and/or populate a web page or other type of forum with the information contained in the record 132 and the record 208. Additionally, the tracking tool 128, the tracking tool 206, and/or the computing system 210 can be configured to provide the statistics to external network sites (e.g. web pages or other types of forums) for publication. To achieve this, the tracking tool 128, the tracking tool 206, and/or the computing system 210 can be configured to include the necessary logic, commands, instructions, and protocols to communicate with the external network sites via the network 106.

Figure 3:
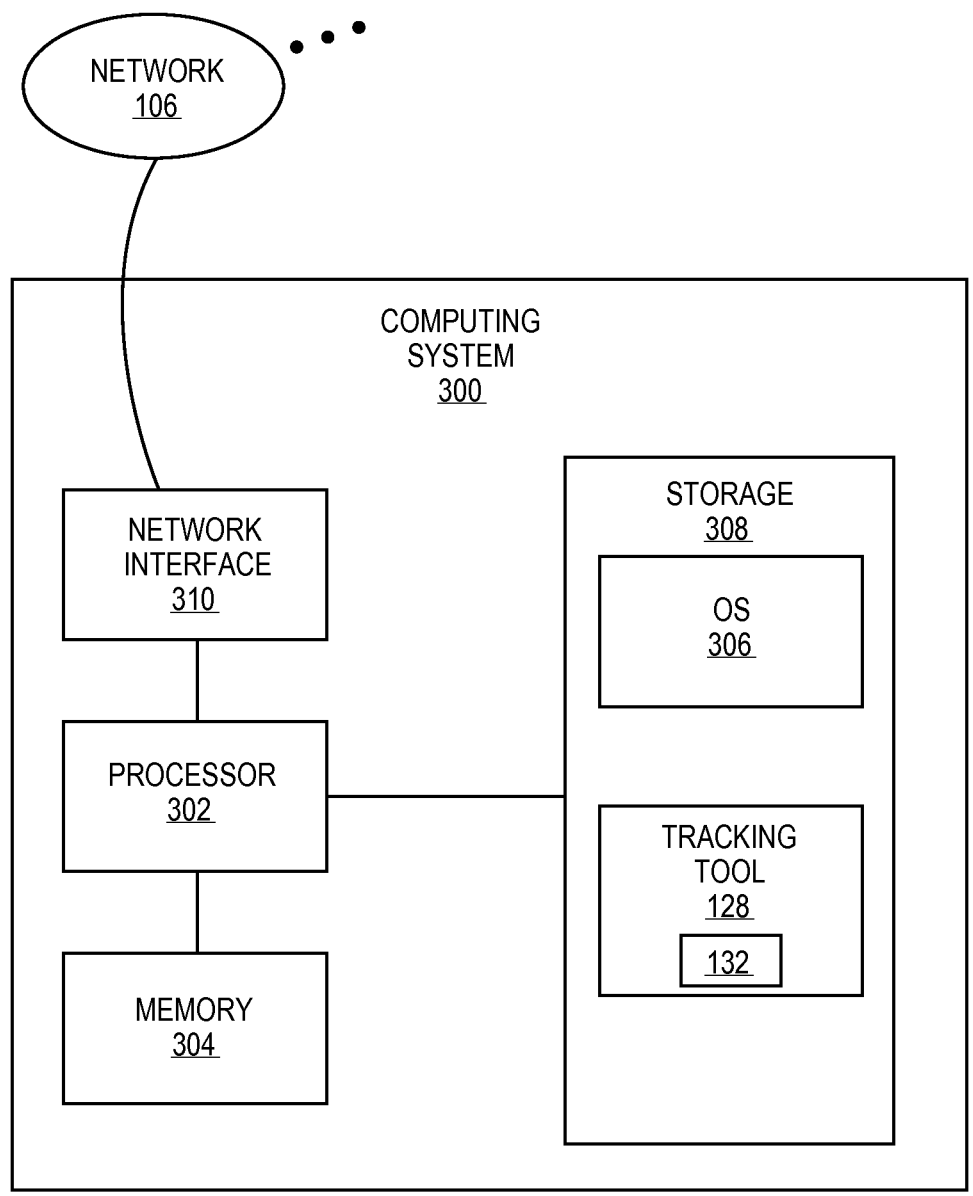
FIG. 3 illustrates an exemplary hardware configuration for a computing system capable of executing the tracking tool, according to various embodiments.

FIG. 3 illustrates an exemplary diagram of hardware and other resources that can be incorporated in a computing system 300, such as the computing systems supporting the software repository 104 and/or the software repository 202 and/or the computing system 210, and configured to store and execute the tracking tool 128, according to embodiments. In embodiments as shown, the computing system 300 can comprise a processor 302 communicating with a memory 304, such as electronic random access memory, operating under control of or in conjunction with a operating system (OS) 306.

The OS 306 can be, for example, a distribution of the Linux™ operating system, such as Red Hat™ Enterprise Linux, Fedora, etc., the Unix™ operating system, or other open-source or proprietary operating system or platform. The processor 302 also communicates with one or more computer readable storage devices or media 308, such as hard drives, optical storage, and the like, for maintaining the OS 306, the tracking tool 128, and the record 132. The processor 302 further communicates with network interface 310, such as an Ethernet or wireless data connection, which in turn communicates with one or more networks 106, such as the Internet or other public or private networks.

The processor 302 also communicates with the tracking tool 128 to execute the logic of the tracking tool 128 and to allow performance of the processes as described herein. Other configurations of the computing system 300, associated network connections, and other hardware and software resources are possible.

While FIG. 3 illustrates the computing system 300 as a standalone system including a combination of hardware and software, the computing system 300 can include multiple systems operating in cooperation. As described above, the tracking tool 128 can be implemented as an application program capable of being executed by the computing system 300, as illustrated, or other conventional computer platforms. Likewise, the tracking tool 128 can also be implemented as a software module or program module capable of being incorporated in other software applications and programs, such as the OS 306 of the computing system 300, a software repository application, and/or combined in a single application or program. In any example, the tracking tool 128 can be implemented in any type of programming language. When implemented as an application program, application module, or program code, the tracking tool 128 can be stored in a computer readable storage medium, such as the storage 308, accessible by the computing system 300. Likewise, during execution, a copy of the tracking tool 128 can be stored in the memory 304.

Figure 4:
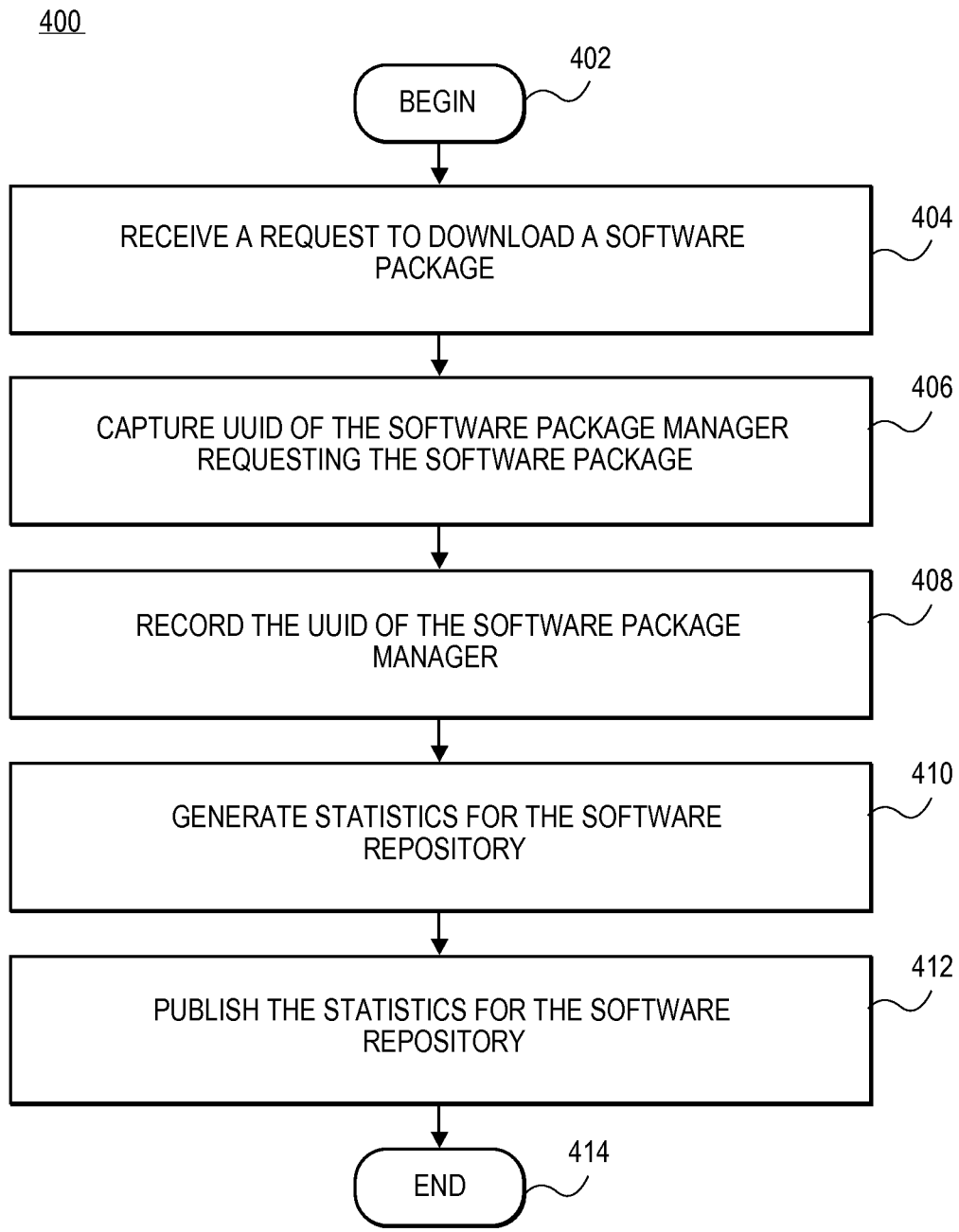
FIG. 4 illustrates a flowchart of an exemplary process for tracking computing systems, according to various embodiments.

FIG. 4 illustrates a flow diagram for a process 400 of tracking computing systems accessing a software repository, according to embodiments of the present teachings. One skilled in the art will realize that the software repository 104 and/or the software repository 202 can perform the process 400.

In 402, the process can begin. In 404, the software repository 104 can receive a request to download one or more of the software packages 108. For example, the computing system 102 can request one or more of the software package 108 utilizing the software package manager 110.

In 406, the software repository 104 can capture the UUID associated with the computing system. For example, the software repository 104 can be encoded as the base URL 130 "http:/www.example.com/myreop/?uuid=$uuid." In this example, when a software package manager access the base URL 130, the value "$uuid" can be replaced with the UUID of the software package manager requesting access. For instance, when the software package manager 110 of the computing system 102 requests access, the value "$uuid" can be replaced with the UUID 114 of the software package manager 110.

In 408, the software repository 104 can record the captured UUID. For example, the tracking tool 128 can record the UUID in the record 132. When a UUID is captured, the tracking tool 128 can search the record 132 to determine if the UUID is already recorded, to generate a new entry for the UUID if the UUID is not recorded, and to record the captured UUID and the other information in the record 132. Likewise, for example, if the captured UUID is already recorded, the tracking tool 128 can update the other information and the date/time information.

In 410, the software repository 104 can generate statistics of the computing systems accessing the software repository 104. For example, the tracking tool 128 can access the record 128 to determine the number of computing systems that have accessed the software repository or the other statistics as described above. In 412, the software repository 104 can publish the generated statistics. For example, the software repository 104 can publish the generated statistics in a web page or other forum, whether hosted by the software repository 104 or hosted by an external network site.

In 414, the process can end, repeat, or return to any point.

Certain embodiments can be performed as a computer application program. The application program can exist in a variety of forms both active and inactive. For example, the application program can exist as software program(s) comprised of program instructions in source code, object code, executable code or other formats. Any of the above can be embodied on a computer readable medium, which include computer readable storage devices and media, and signals, in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present teachings can be configured to access, including signals downloaded through the Internet or other networks. Concrete examples of the foregoing include distribution of executable software of the computer application program on a CD-ROM or via Internet download.

While the teachings have been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method, comprising:
providing, to a software package manager, access to a software repository using a uniform resource locator (URL);
receiving, at the software repository, a request to download a software package from the software package manager;
capturing, upon access to the URL by the software package manager, an identifier that is assigned by the software package manager, the identifier to be used to track a computing system, wherein the identifier is specific to the software package manager, wherein the identifier comprises a universal unique identifier (UUID), wherein the URL comprises a replaceable field for the identifier and wherein capturing the identifier comprises replacing the replaceable field with the UUID; and recording, by a processor, the identifier at the software repository.

2. The method of claim 1, the method further comprising:

receiving, at the software repository, a request to download another software package from a second software package manager;

capturing, from the second software package manager, a second identifier that is associated with the second software package manager; and recording the second identifier at the software repository.

3. The method of claim 2, the method further comprising:

storing the identifier and the second identifier in a record, wherein the record identifies a number of computing systems that have requested software packages from the software repository.

4. The method of claim 3, the method further comprising:

publishing the number of computing systems that have requested the software packages.

5. The method of claim 3, the method further comprising:

providing, to a tracking system, the number of computing systems that have requested the software package, wherein tracking system is to track the number of computing systems that have requested the software packages from the software repository and a number of computing systems that have requested software packages from other software repositories.

6. The method of claim 1, wherein the identifier is a random value.

7. A non-transitory computer readable medium comprising instructions to cause a processor to perform operations comprising:

providing, to a software package manager, access to a software repository using a uniform resource locator (URL);

receiving, at the software repository, a request to download a software package from the software package manager;

capturing, upon access to the URL by the software package manager, an identifier that is assigned by the software package manager, the identifier to be used to track a computing system, wherein the identifier is specific to the software package manager, wherein the identifier comprises a universal unique identifier (UUID), wherein the URL comprises a replaceable field for the identifier and wherein capturing the identifier comprises replacing the replaceable field with the UUID; and recording, by the processor, the identifier at the software repository.

8. The non-transitory computer readable medium of claim 7, the operations further comprising:

receiving, at the software repository, a request to download another software package from a second software package manager;

capturing, from the second software package manager, a second identifier that is associated with the second software package manager; and recording the second identifier at the software repository.

9. The non-transitory computer readable medium of claim 7, wherein the identifier is a random value.

10. An apparatus comprising:

a memory to contain instructions; and a processor coupled to the memory, the processor to:

provide, to a software package manager, access to a software repository using a uniform resource locator (URL);

receive, at the software repository, a request to download a software package from the software package manager;

capture, upon access to the URL by the software package manager, an identifier that is assigned by the software package manager, the identifier to be used to track a computing system, wherein the identifier is specific to the software package manager, wherein the identifier comprises a universal unique identifier (UUID), wherein the URL comprises a replaceable field for the identifier and wherein capturing the identifier comprises replacing the replaceable field with the UUID; and record the identifier at the software repository.

11. The apparatus of claim 10, the processor further to:

receive, at the software repository, a request to download another software package from a second software package manager;

capture, from the second software package manager, a second identifier that is associated with the second software package manager; and record the second identifier at the software repository.

12. The apparatus of claim 11, the processor further to:

store the identifier and the second identifier in a record, wherein the record identifies a number of computing systems that have requested software packages from the software repository.

13. The apparatus of claim 12, the processor further to:

publish the number of computing systems that have requested the software packages.

14. The apparatus of claim 10, wherein the identifier is a random value.

* * * * *